Patented July 2, 1935

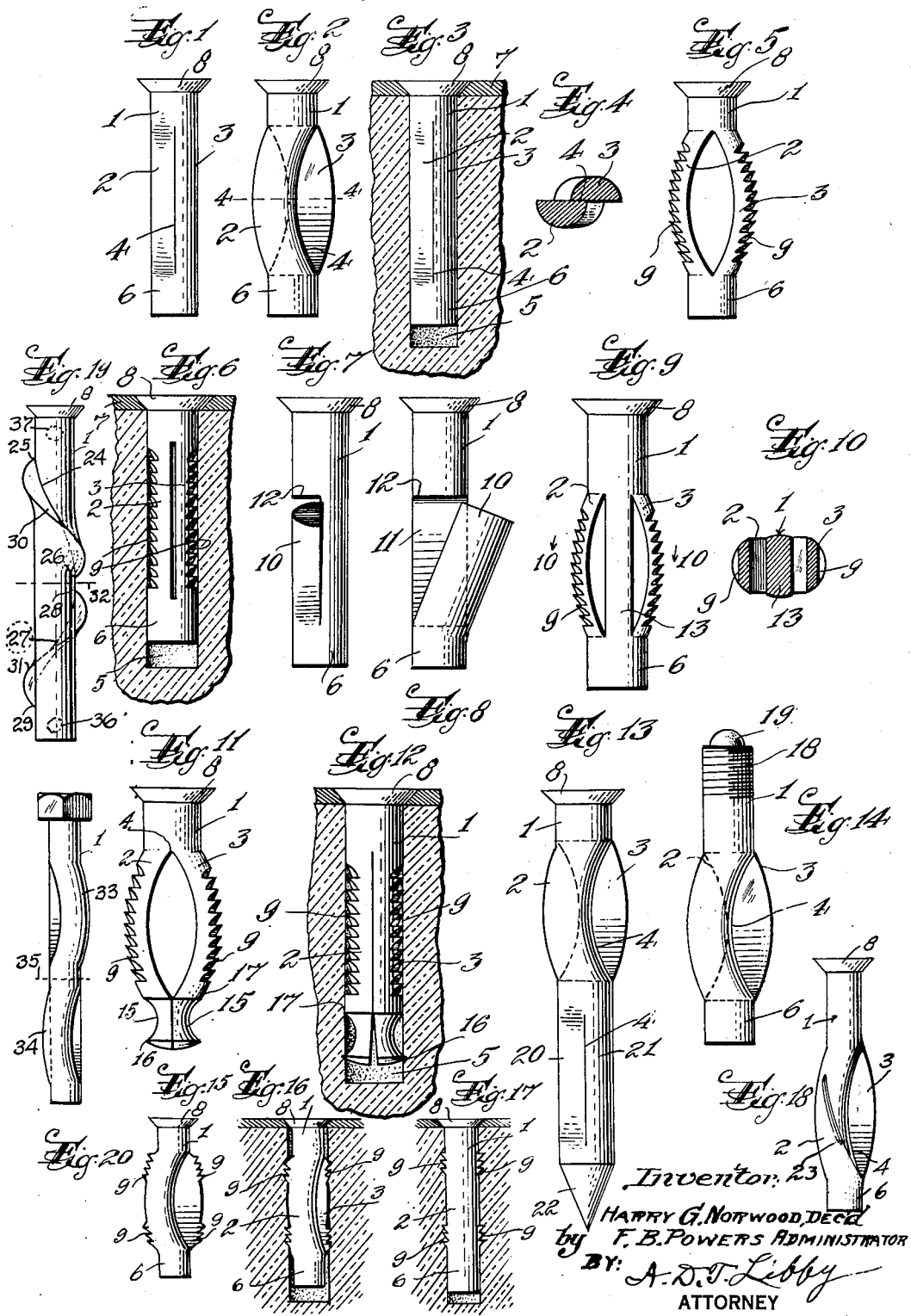

2,006,813

UNITED STATES PATENT OFFICE 2,006,813

SELF-LOCKING DRIVE EXPANSION FASTENER

Harry G. Norwood, deceased, late of New York, N. Y., by Frederic B. Powers, administrator, New York, N. Y., assignor to Nor-Bolt Holding Corporation, New York, N. Y., a corporation of New York Application June 6, 1934, Serial No. 729,174

16 Claims. (Cl. 72—105)

This invention relates to a new and improved form of self-locking drive expansion fastener especially designed for use in attachment of devices to stone, cement, concrete and other structures to which it may be usefully applied.

This application is a combination of and a continuation in greater part of the following applications filed by Harry G. Norwood: Serial No. 646,340, filed December 8, 1932 and Serial No. 651,028, filed January 10, 1933.

It is one of the objects of the invention to provide an economical and efficient self-locking expansion fastener which can be driven like a nail into a suitable cavity formed in a structure to receive the fastener, and which, without the use of wedges, plastics or other fastening means, will offer tremendous resistance to withdrawal.

Another object of the invention is to provide a self-locking fastener for the purpose indicated which is made from a single integral piece of suitable metal.

Another object of the invention is the provision of a self-locking fastener so constructed that when it is forced into its retaining cavity, certain distorted or expanded portions of the fastener will be compressed, while other portions thereof are being expanded, thus providing a double-bending and locking action.

A still further object of the invention is to provide a single-piece expansion fastener which is cheap to manufacture and one that greatly reduces the cost of installation.

The foregoing objects and others will be evident from the following description taken in connection with the annexed drawing, wherein:

Figure 1 shows an elevational view of one form of the fastener.

Figure 2 is a view of Figure 1 taken at ninety degrees.

Figure 3 is a view of the fastener of Figures 1 and 2 after it has been forced into holding position.

Figure 4 is a section on the line 4—4 of Figure 2.

Figure 5 is an elevation of a modified form of fastener with portions in expanded position.

Figure 6 is a view of the fastener shown in Figure 5 after it has been forced into holding position.

Figure 7 is a view of a further modified form of fastener.

Figure 8 is a view of Figure 7 taken at an angle of ninety degrees.

Figure 9 shows a further modified form of fastener with the parts in expanding position.

Figure 10 is a view on the line 10—10 of Figure 9.

Figure 11 shows a still further modified form of fastener with certain parts in expanded position.

Figure 12 is a view of the fastener of Figure 11 after it has been forced into holding position.

Figure 13 is a further form of fastener more in the shape of a nail.

Figure 14 is an elevational view of a further modified form of fastener.

Figure 15 is an elevational view of a fastener such as shown in Figure 2, with extra gripping means at the ends of the expanded portions.

Figures 16 and 17 show the application of the fastener of Figure 15, the hole to receive the fastener in Figure 16 being somewhat larger than the fastener.

Figure 18 shows a single rib on the expanded portions of the fastener.

Figure 19 shows spirally arranged expanded portions on the fastener.

Figure 20 shows single expanded portions on the fastener.

Fasteners embodying the present invention may be composed of different metals or metal compositions, but it is important that whatever metal is used, it should be sufficiently elastic, resilient or springy to give the necessary gripping qualities. Metals which may be heat-treated to enhance their resilience or springiness for the purpose of the present invention may, of course, be employed. While certain types of metals inherently possess sufficient resilience or springiness for certain uses of the present invention, these metals may have their resiliency or springiness increased by heat treatment and may thus be made suitable for even more severe uses to which articles embodying the invention may normally be put.

In the form of the invention shown in Figures 1 to 4, the expansion fastener 1 is formed from a single piece of metal with a solid end portion 8 and a body portion which is sheared on the line 4 intermediate its ends and generally longitudinally of its length to form portions 2 and 3. These portions 2 and 3 may be displaced relatively as by being distorted laterally as best shown in Figure 2; that is, with their sheared surfaces substantially parallel to each other and in substantially the same plane. They may also be distorted radially away from each other as will be presently described.

When the fastener is driven into a hole 5 in the material, such as concrete, the expanded portions 2 and 3 are forced toward the axial center of the fastener, thereby exerting an exceedingly strong grip against the side walls of the hole 5, it being understood that the hole 5 is of a suitable size to give the maximum gripping effect of the fastener. In certain classes of work, the hole 5 is only just large enough to receive the entering end 6 of the fastener.

As shown in Figure 3, a device such as a plate 7 is adapted to be held in position by the head 8 of the fastener. It may be mentioned at this point that such a fastener as shown in Figures 1 to 4 inclusive produces little scoring effect on the wall of the cavity or hole 5 when the fastener is driven into position.

In Figure 5, the fastener is split longitudinally of its length and the portions 2 and 3 are displaced, not laterally as in Figures 2 and 4, but radially. In addition, the portions 2 and 3 may be provided with gripping means 9 which may take any suitable form, that shown being in the form of barbs centrally disposed on the outer surface of the expanded portions 2 and 3. When driving the fastener into the position shown in Figure 6, the gripping means 9 slip on the walls but will dig thereinto when a pull is applied to withdraw the fastener.

In Figures 7 and 8, a single portion 10 is shown sheared on the lines 11 and 12 of the body of the fastener 1 and displaced at an angle to the axis of the fastener. The action of the fastener will be clear without further explanation.

In Figures 9 and 10, the two portions 2 and 3 of the fastener are split from a permanently central portion 13 and these portions may be provided with gripping means 9 of some suitable form. The action of this form of fastener is somewhat similar to that shown in Figure 5.

In Figures 11 and 12, the portions 2 and 3 are split or displaced from each other from the line 14 to the extremity of the fastener. The inserting end, however, has a concave formation 15 terminating in a circular gripping edge 16. As this type of fastener is driven into the cavity or hole 5, the concave portion 15 has a tendency to fulcrum along the line 17 to turn the locking edge 16 into the walls of the cavity somewhat as shown in Figure 12, at about the time the fastener reaches the end of its inward travel. In this form it will be seen that the inward movement of the portions 2 and 3 toward each other, when the fastener is driven into the hole, tends to cause the edge 16 of the concave portion 15 to move outwardly.

In Figure 13, the fastener 1 is in the shape of a nail having an entering point 22, the portions 2 and 3 being displaced as in Figure 2. The fastener of Figure 13 may have additional displaced portions intermediate its ends; for example, a second set of displaced portions 20 and 21 positioned at an angle to the other displaced portions on the fastener. These displaced portions may have the gripping means 9 arranged on the edges of the displaced portions.

In Figure 14, there is shown a stud type of fastener in which the parts 2 and 3 are displaced as in Figure 2, the outer end of the stud being provided with screw-threads 18 to receive a nut. This end is also provided with a formation 19 for driving the stud into position in the hole, whereby the thread 18 will not be injured. The parts 2 and 3 may be provided with gripping means of any suitable kind.

While the gripping means in some cases may extend over all of the surface of the distorted or extended portions, in many cases it is preferable—where they are located on the edge of the displaced portion—to position them at the extremity of the curved portions so that the initial engagement of the expanded portions with the wall of the cavity is smooth and the gripping means only engage the wall after the expanded portions have been already greatly compressed. This construction is illustrated in Figures 15 to 17 inclusive, wherein the gripping means are indicated as formed or rolled on the outer extremity of the material.

In Figure 18 the fastener 1 is provided with two laterally offset portions as in Figure 2, and each portion is provided with one or more (only one being shown) ribs or ridges 23 which preferably do not extend to either end of the expanded portion. The effect of the ribs 23 is to turn the fastener as it is driven in, thereby getting a screw effect, since the rib or ribs 23 are positioned so the turning of the fastener by the ribs is in a direction such that the smooth sloping surfaces of the displaced portions 2 and 3 will offer a minimum resistance to turning, but any force tending to pull the fastener out of the hole will turn the fastener in the opposite direction, as the ribs 23 will tend to follow back through the path which they have made when the fastener was driven in, but the relatively sharp edges of the sheared displaced faces 2 and 3 will engage the wall of the hole, thereby resisting the turning of the fastener and hence resisting the withdrawal force.

In Figure 19 the fastener 1 is sheared spirally from the point 25 along the line 24 to the point 26, and on the backside of the fastener it is sheared spirally from the point 28 along the line 27 to the point 29, the expanded portions 30 and 31 forming what in effect is a continuous spiral. The fastener shown in Figure 19 may be made in two parts, preferably symmetrical halves securely anchored together in any satisfactory manner as by spot-welding at 36 and 37; in fact, the other types of fasteners herein shown may be made in a similar manner rather than from one piece of material, but when so constructed, they become in reality single-piece fasteners and the claims are intended to cover any construction which gives the equivalent single-piece, self-locking drive expansion fastener. It may be further stated that in Figure 19 the fastener may stop at the line 32.

In Figure 20, the fastener has two spaced sheared and offset portions 33 and 34, although the fastener may end at the dotted line 35, thereby having only one sheared and offset portion. The expanded portions 33 and 34 may be provided with a rib 23 as in Figure 18.

If, in Figure 11, the fastener is made in two parts fastened together as by spot-welding, this is only done at the head end of the fastener. It will be observed that the construction of Figures 2 and 5 may be combined; that is to say, the portions 2 and 3 may be sheared and expanded laterally on the line 4 and then separated away from each other as in Figure 5. Also, the gripping means shown in the devices of Figures 5, 9 and 11 may be arranged at the extremities of the expanded portions as shown in Figure 15.

It is to be understood that the dimensions of the drive fastener may be varied according to the work the fastener is to perform, and the fasteners may be made by any suitable method or machines. While in several of the forms a screw type of head is shown, the head 8 may be of any shape desired. In several of the forms there are shown gripping means which may or may not be used as desired. In a great many cases they are not necessary as it has been found that the form of self-locking, drive-expansion fastener herein described, having a smooth surface throughout, offers tremendous resistance to its withdrawal after having once been driven into a cavity of a size to suit the fastener.

It will be readily appreciated that the type of drive fastener described herein offers many advantages over the multi-piece expansion bolts heretofore used. One of these is in the reduced cost of manufacture of the fastener per se, and the other is in the cost of installation, as no calking operations are required as in most bolt anchors of the prior art.

It will also be seen that various details entering into the construction of this fastener may be varied without departing from the spirit of the invention or the scope of the appended claims.

What is claimed is:

1. A single-piece, self-locking drive expansion fastener of the character described composed of springy metal and being smooth for at least the greater part of its surface and having a solid portion at one end for driving the fastener and a body portion, said body portion being split at least once therethrough generally longitudinally of its length, at least one of said split portions being displaced relatively away from another of the body portions, the fastener being adapted to be forced within an unthreaded cavity and retained within said cavity by intense pressure of its displaced portions against the wall of the cavity.

2. A single-piece drive expansion fastener formed of metal possessing elasticity, said fastener being sheared generally longitudinally between its ends, at least one of the sheared portions being displaced laterally with respect to an adjacent portion, the sheared faces being still in substantially the same plane.

3. A single-piece drive expansion fastener formed from metal capable of taking a spring temper after being subjected to heat treatment, said fastener having a portion intermediate its ends sheared before being heat-treated, and the sheared parts being forced in opposite directions to form a curved expanded shape but with the sheared faces substantially in the same plane.

4. A single-piece drive expansion fastener of metal having the property of elasticity especially after being heat-treated, said fastener having a smooth exterior surface for at least the greater portion of its surface and having a portion sheared generally longitudinally of its length with at least one sheared portion displaced from its initial position.

5. A single-piece drive expansion fastener made of elastic metal formed with a driving portion and a body portion, the body having a split portion extending entirely therethrough from a point below the driving portion to its extreme lower end, the split portions being distorted outwardly, and a concave formation at the advancing end of the body.

6. A single-piece drive expansion fastener made of elastic metal capable of being heat-treated and formed with a driving portion and a body portion, the body portion being split entirely therethrough at a point below the driving portion with the split portions expanded outwardly intermediate its length, a concave formation at the advancing end portion, and a circular edge forming its lowermost end.

7. A self-locking drive fastener comprising a body of metal having the property of elasticity, a formation on the body for driving the fastener, said body being formed with a split therethrough, with the portions of the body adjacent the split being bent outwardly to form a compressible fastener body of increased diameter, and a substantially circular flange on the advancing end of the fastener, said flange having portions adapted to move radially outwardly upon radially inward movement of the compressible portions of the fastener body.

8. A self-locking drive fastener comprising a body of metal capable of taking a heat treatment to increase its springy properties, said body being split intermediate its ends, the split portions of the body being displaced at a distance from the advancing end of the fastener in opposite directions to form a curved expanded shape, at least those parts of the curved expanded portions, which first engage the wall of the hole into which the fastener is driven, being smooth.

9. A device of the class described with an integral body of elastic material which will take heat treatment, said body being split therethrough to its inserting end, portions of said body being distorted outwardly with oppositely disposed curved formations, the said inserting ends being formed so that when the distorted portions are compressed the said inserting end portions will be expanded.

10. A drive expansion fastener as set forth in claim 1, further characterized in that gripping means are formed on said displaced portions only.

11. A drive expansion fastener as set forth in claim 3, further characterized in that gripping means are formed on the edge only of said expanded parts, and preferably at the extremities thereof.

12. A drive expansion fastener as set forth in claim 1, further characterized in that gripping means are formed on said displaced portions only, said gripping means comprising at least one rib extending generally along the length of said displaced portions as and for the purposes described.

13. A drive expansion fastener as set forth in claim 1, further characterized in that the split is made spirally and continuous, if desired, along the length of the fastener.

14. A drive expansion fastener as set forth in claim 1, further characterized in that the body of the fastener is split and offset at least once in a spiral direction along the fastener.

15. A drive expansion fastener as set forth in claim 2, further characterized in that the surface of the sheared and displaced portion of the fastener has at least one rib arranged thereon tending to rotate the fastener in some degree as it is driven into place, while the edge of the sheared displaced portion will directly engage the wall of the hole on reverse rotation of the fastener caused by a force tending to withdraw it.

16. A drive expansion fastener as set forth in claim 3, further characterized in that the curved expanded portions of the fastener are provided with ribs arranged thereon so as to tend to turn the fastener in one direction when it is driven into a hole, the expanded portions of the fastener for this direction of rotation presenting only smooth sloping surfaces, but presenting resisting edges which will engage the wall of the hole should the fastener start turning in the opposite direction due to any withdrawal force.

FREDERIC B. POWERS,
Administrator for Harry G. Norwood, Deceased.